Oct. 4, 1949.  R. C. PIERCE  2,483,430

SHOCK ABSORBER

Filed Oct. 29, 1945

INVENTOR.
Raymond C. Pierce
BY
Orin O. B. Garner
Atty.

Patented Oct. 4, 1949

2,483,430

UNITED STATES PATENT OFFICE 2,483,430

SHOCK ABSORBER

Raymond C. Pierce, Chicago, Ill.

Application October 29, 1945, Serial No. 625,167

4 Claims. (Cl. 267—34)

This invention relates to hydraulic shock absorber devices and more particularly to a novel oleo shock strut commonly utilized in the connection between the landing gear and fuselage of an aircraft.

A general object of the invention is to provide novel means for metering the hydraulic fluid within the device, particularly on the closure stroke thereof, said metering means being particularly adapted to afford relatively large frictional areas along which the fluid may flow at relatively great velocity during metering thereof, thus increasing the amount of friction developed thereby.

A specific object of the invention is to provide a novel metering device such as above described wherein a pile or stack of plates define interstices therebetween communicating with ports through respective plates to define a labyrinthian metering passage, said passage being in communication at opposite ends thereof with the high and low pressure chambers respectively of the strut cylinder.

Another object of the invention is to design a metering device such as above described wherein the ports of respective plates are misaligned, thus preventing direct flow of hydraulic fluid through said ports between the high and low pressure chambers of the cylinder and directing the fluid through the interstices. By means of this arrangement the flow of fluid through the interstices increases the velocity of said fluid and the heat developed by the friction of the fluid passing through the ports is absorbed by the relatively large areas of the surfaces of the plates defining the interstices, whereupon the hydraulic fluid, after passing through the interstices, may flow passively at relatively low velocity into the low pressure chamber. It will be understood that this passive flow prevents foaming of the hydraulic fluid and entrapment therein of air bubbles as the hydraulic fluid compresses the air spring disposed within the low pressure chamber and adapted to return the piston of the strut to the extended position thereof.

Still another object of the invention is to design a metering device such as above described including by-pass valve means for opening the high and low pressure chambers to direct communication independently of the interstices during the extension stroke of the strut, thereby insuring rapid release or extension thereof.

Figure 1:
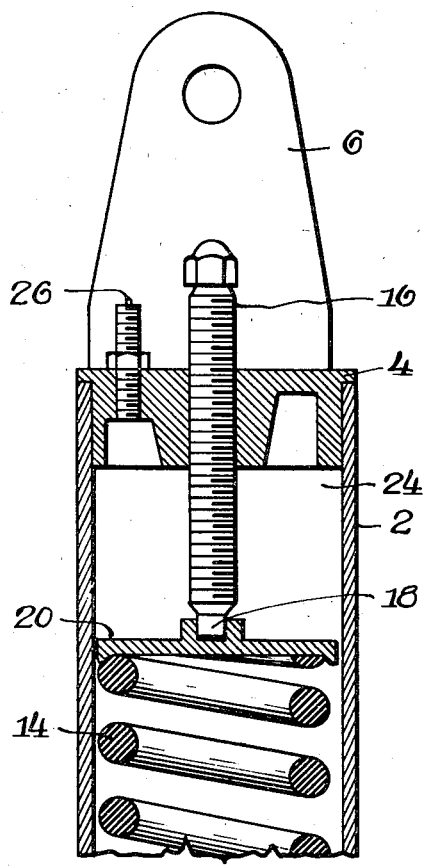
Figure 2:
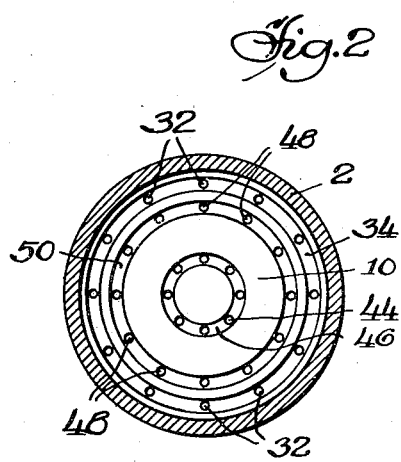
Figure 2:
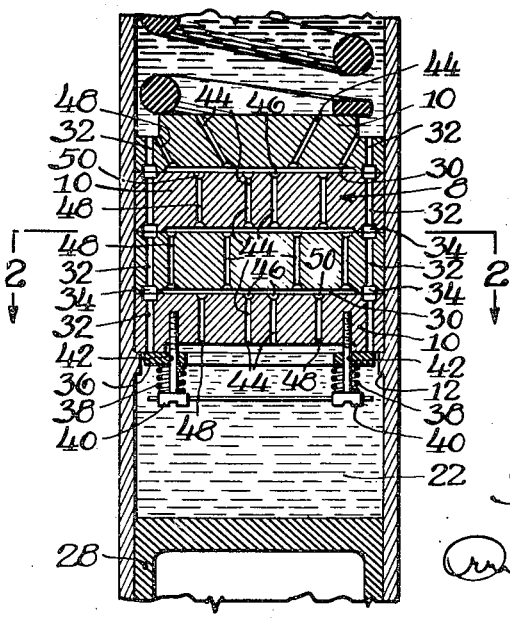

The foregoing and other objects and advantages of the invention will become apparent from a consideration of the following specification and accompanying drawings wherein:

Figure 1 is a longitudinal sectional view of a strut embodying the invention, and Figure 2 is a sectional view taken in the transverse plane indicated by the line 2—2 of Figure 1.

Describing the invention in detail, the strut comprises a cylinder 2 including a head 4 with a perforated bracket 6 secured thereto and adapted for connection to the fuselage (not shown) of an associated aircraft.

Carried by the cylinder 2 intermediate the ends thereof is a metering device or valve generally designated 8, said device comprising a plurality of plates 10 urged into a pile or stack against an internal flange or rib 12 of the cylinder 2 by means of a compression spring 14 adjustably compressed against the top plate 10 by a bolt 16 threaded into the head 4 and comprising a cylindrical nose 18 rotatably fitted within a complementary opening in a spring cap 20 bearing against the top of the spring 14.

The device 8 divides the cylinder 2 into high and low pressure chambers 22 and 24, the latter containing at its upper extremity an air spring comprising a body of compressed air introduced into the cylinder 2 through a conventional fitting or valve 26. A piston 28 is slidably fitted within the cylinder 2 in the high pressure chamber 22 thereof for reciprocation therewithin during the extension and release strokes of the strut as will be understood by those skilled in the art.

Each of the plates 10 above the bottom plate is preferably recessed on its lower surface to define an interstice at 30 with the abutting plate. These interstices are exaggerated in the drawings and are preferably of the order of six to twenty-thousandths of an inch in depth so as to accommodate a relatively thin layer of hydraulic fluid flowing therethrough, thereby enabling relatively efficient heat transfer between the fluid flowing through the interstices and the plates 10.

Each plate 10 is provided with a plurality of radially outer ports 32 extending axially therethrough, said ports communicating with annular recesses 34 in the top and bottom of the plate, the recesses 34 being eliminated on the bottom surface of the bottom plate 10 inasmuch as the lower extremity of the ports 32 through the bottom plate 10 is closed by an annular flapper valve plate 36 yieldingly urged to its closed position by springs 38, 38 mounted on stud bolts 40 threaded into the bottom plate 10, said bolts being slidably fitted within complementary openings at 42 in the flapper valve plate 36. Thus it will be understood that on the release or extension stroke of the strut the valve plate 36 is urged to its open position by the relatively high pressure of the hydraulic fluid within the ports 32 inasmuch as the pressure within the chamber 22 is at that time lower than the pressure within the ports 32. As the plate 36 moves to its open position the high and low pressure chambers 22 and 24 of the strut are thus placed in direct communication through the ports 32 and the recesses 34.

Each plate 10 is also provided with an annular series of radially inner ports 44 communicating with annular grooves 46 in the top and bottom of the plate, and each plate is also provided with an annular series of ports 48 disposed intermediate the ports 32 and the ports 44, said ports 48 communicating with annular recesses or grooves 50 in the top and bottom of the plate. It may be noted that the grooves 46 and 50 are eliminated in the bottom surface of the bottom plate 10 and in the top surface of the top plate 10 inasmuch as these plates are at opposite ends of the series. Thus on the closure or compression stroke of the strut, the springs 38 and the relatively high pressure within the high pressure chamber 22 operate to urge the flapper valve plate 36 to its closed position, whereupon the hydraulic fluid within the strut is urged upwardly through the ports 44 and 48 and the interstices 30 into the low pressure chamber 24 comprising the air spring therewithin, said spring being operable to return the strut to its extended or release position as above described.

It may be noted that the ports 44 and 48 of each plate are misaligned with respect to the corresponding ports of the abutting plate, whereby the hydraulic fluid passing through these ports is directed through the interstices 30 for the purposes above described; and it may also be noted that the ports 44 and 48 of the top plate are angularly related with respect to the longitudinal axis of the strut so that the upper extremities of these ports are further from said axis than the lower extremities thereof, whereby the hydraulic fluid passing through the ports 44 and 48 of the top plate 10 is directed radially outwardly against the cylinder 2 to prevent foaming of the hydraulic liquid and resultant entrapment of air bubbles therein.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a shock strut, a cylinder, a plurality of plates therein dividing said cylinder into high and low pressure chambers, interstices between said plates, a plurality of ports through each plate communicating with the associated interstices, the ports in each plate being misaligned with respect to the ports in the adjacent plate, a piston reciprocal within said high pressure chamber, by-pass valve means comprising aligned passages through all of said plates spaced from said interstices and affording communication between said chambers independently of said interstices, a valve member in said high pressure chamber, and resilient means urging said valve member to the closed position thereof over the passages in the associated plate.

2. In an hydraulic shock absorber device, a cylinder containing hydraulic fluid, metering means carried by said cylinder dividing the same into high and low pressure chambers, a piston reciprocal within said high pressure chamber, said metering means comprising a stack of rigid plates in said cylinder, interstices between said rigid plates, ports through respective plates communicating with said interstices and defining therewith a labyrinthian passage, each end of said passage communicating with one of said chambers, and by-pass valve means for opening said chambers to communication with each other independently of said passage on the extension stroke of the device, said plates being movable away from each other to enlarge said interstices therebetween upon rapid closure of said device due to the imposition of a sudden severe shock thereagainst, the ports in the plate facing said low pressure chamber diverging from the axis of said cylinder for directing the fluid against the sides of said cylinder in the low pressure chamber to prevent foaming of said fluid.

3. In an hydraulic shock absorber device, a cylinder containing hydraulic fluid, metering means carried by said cylinder and comprising a stack of rigid plates therewithin, interstices between respective plates, ports through said plates communicating with said interstices, means for forcing said fluid through said ports and through said interstices, said plates being movable away from said last-mentioned means and being separable from each other to vary said interstices under certain closure conditions of said plates, and openings in said plates independent of said ports and interstices, said openings being arranged to communicate with said interstices upon separation of said plates and serving as additional passageways for said fluid.

4. In an hydraulic shock absorber device, a cylinder containing hydraulic fluid, metering means comprising a stack of plates slidably carried by said cylinder dividing the same into high and low pressure chambers, and a piston reciprocal within said high pressure chamber, ports through said plates misaligned with respect to each other, interstices between adjacent plates communicating with respective ports, passages through said plates affording communication between said chambers independently of said ports and interstices, one-way valve means closing said passages upon closure of said device and opening the same upon extension of said device, said plates being separable upon certain closure conditions of said device for opening said interstices to communication with the passages in certain of said plates to permit the flow of fluid through said passages into said low pressure chamber in addition to the flow through said ports.

RAYMOND C. PIERCE.

REFERENCES CITED

The following references are of record in the file of this patent:

UNITED STATES PATENTS

| Number | Name | Date |
| --- | --- | --- |
| Re. 18,696 | Messier | Dec. 20, 1932 |
| 1,855,064 | Messier | Apr. 19, 1932 |
| 2,021,079 | Mittendorf et al. | Nov. 12, 1935 |
| 2,132,854 | Knott | Oct. 11, 1938 |
| 2,210,448 | Dodge | Aug. 6, 1940 |
| 2,255,181 | Newton | Sept. 9, 1941 |
| 2,352,401 | O'Connor | June 27, 1944 |

FOREIGN PATENTS

| Number | Country | Date |
| --- | --- | --- |
| 114,161 | Austria | Sept. 10, 1929 |